United States Patent
Monacchio et al.

(10) Patent No.: US 10,525,485 B2
(45) Date of Patent: Jan. 7, 2020

(54) WATER EXTRACTOR

(71) Applicant: Hamilton Sundstrand Corporation, Charlotte, NC (US)

(72) Inventors: John D. Monacchio, Windsor Locks, CT (US); Murtuza Lokhandwalla, South Windsor, CT (US); Brian R. Shea, Windsor, CT (US); Lance R. Bartosz, Granby, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 183 days.

(21) Appl. No.: 15/679,772

(22) Filed: Aug. 17, 2017

(65) Prior Publication Data
US 2019/0015844 A1    Jan. 17, 2019

Related U.S. Application Data

(63) Continuation of application No. 15/647,505, filed on Jul. 12, 2017.

(51) Int. Cl.
| | |
|---|---|
| *B01D 45/12* | (2006.01) |
| *B01D 45/16* | (2006.01) |
| *B04C 3/06* | (2006.01) |
| *A47L 7/00* | (2006.01) |
| *A47L 9/04* | (2006.01) |
| *B64D 13/06* | (2006.01) |
| *B04C 3/00* | (2006.01) |

(52) U.S. Cl.
CPC .............. *B04C 3/06* (2013.01); *A47L 7/0009* (2013.01); *A47L 9/0411* (2013.01); *B01D 45/12* (2013.01); *B64D 13/06* (2013.01); *A47L 7/00* (2013.01); *B01D 45/16* (2013.01); *B04C 3/00* (2013.01); *B64D 2013/0662* (2013.01)

(58) Field of Classification Search
CPC ................................ B01D 45/12; B01D 45/16
USPC ..................................................... 55/457, 396
See application file for complete search history.

(56) References Cited

U.S. PATENT DOCUMENTS

| | | |
|---|---|---|
| 2,600,302 A | 6/1952 | Kinsella |
| 3,362,155 A | 1/1968 | Driscoll |
| 3,989,489 A | 11/1976 | Van't Sant et al. |
| 3,993,463 A | 11/1976 | Barr |
| 4,224,043 A | 9/1980 | Dupre |
| 4,238,210 A | 12/1980 | Regehr et al. |

(Continued)

FOREIGN PATENT DOCUMENTS

| | | |
|---|---|---|
| EP | 1496240 A2 | 1/2005 |
| EP | 2330033 A2 | 6/2011 |

(Continued)

OTHER PUBLICATIONS

Extended European Search Report for European Patent Application No. 18183275.9, dated Nov. 13, 2018, 8 pages.

(Continued)

*Primary Examiner* — Robert A Hopkins
(74) *Attorney, Agent, or Firm* — Kinney & Lange, P.A.

(57) ABSTRACT

A water extractor includes an outer duct with an inlet and an outlet, and an inner duct with an inlet and an outlet. The inner duct is positioned in the outer duct. The water extractor further includes a gap between the inner duct and the outer duct. The gap is tapered between a first position and a second position.

19 Claims, 13 Drawing Sheets

(56) References Cited

U.S. PATENT DOCUMENTS

| | | | |
|---|---|---|---|
| 4,681,610 A * | 7/1987 | Warner | B01D 45/16 55/338 |
| 6,056,798 A | 5/2000 | Cox | |
| 6,152,978 A | 11/2000 | Lundquist | |
| 6,264,137 B1 | 7/2001 | Sheoran | |
| 6,302,932 B1 | 10/2001 | Unger et al. | |
| 6,331,195 B1 | 12/2001 | Faust et al. | |
| 7,296,395 B1 | 11/2007 | Hartman et al. | |
| 7,338,545 B2 | 3/2008 | Bazzarella et al. | |
| 7,342,332 B2 | 3/2008 | McAuliffe et al. | |
| 7,470,300 B2 | 12/2008 | Faust et al. | |
| 7,691,185 B2 | 4/2010 | Darke et al. | |
| 7,770,375 B2 | 8/2010 | Alvanos et al. | |
| 8,177,475 B2 | 5/2012 | Joco et al. | |
| 8,875,535 B2 | 11/2014 | Peacos, III et al. | |
| 9,199,248 B2 | 12/2015 | Au et al. | |
| 2006/0021356 A1 | 2/2006 | Milde et al. | |
| 2007/0125051 A1 | 6/2007 | Faust et al. | |
| 2007/0186534 A1 | 8/2007 | Snyder | |
| 2016/0045923 A1 | 2/2016 | Correia et al. | |
| 2016/0123227 A1 | 5/2016 | Murray et al. | |
| 2016/0193558 A1 | 7/2016 | Jeong | |
| 2016/0245152 A1 | 8/2016 | Thomassin et al. | |
| 2016/0281721 A1 | 9/2016 | Army, Jr. et al. | |
| 2016/0312698 A1 | 10/2016 | Judd et al. | |
| 2018/0229586 A1 | 8/2018 | Army | |

FOREIGN PATENT DOCUMENTS

| | | |
|---|---|---|
| EP | 3023137 A1 | 5/2016 |
| FR | 2642662 A1 | 8/1990 |
| KR | 20140123918 A | 10/2014 |
| WO | WO2014206457 A1 | 12/2014 |

OTHER PUBLICATIONS

Extended European Search Report for European Patent Application No. 18155170.6, dated Aug. 7, 2018, 7 pages.

* cited by examiner

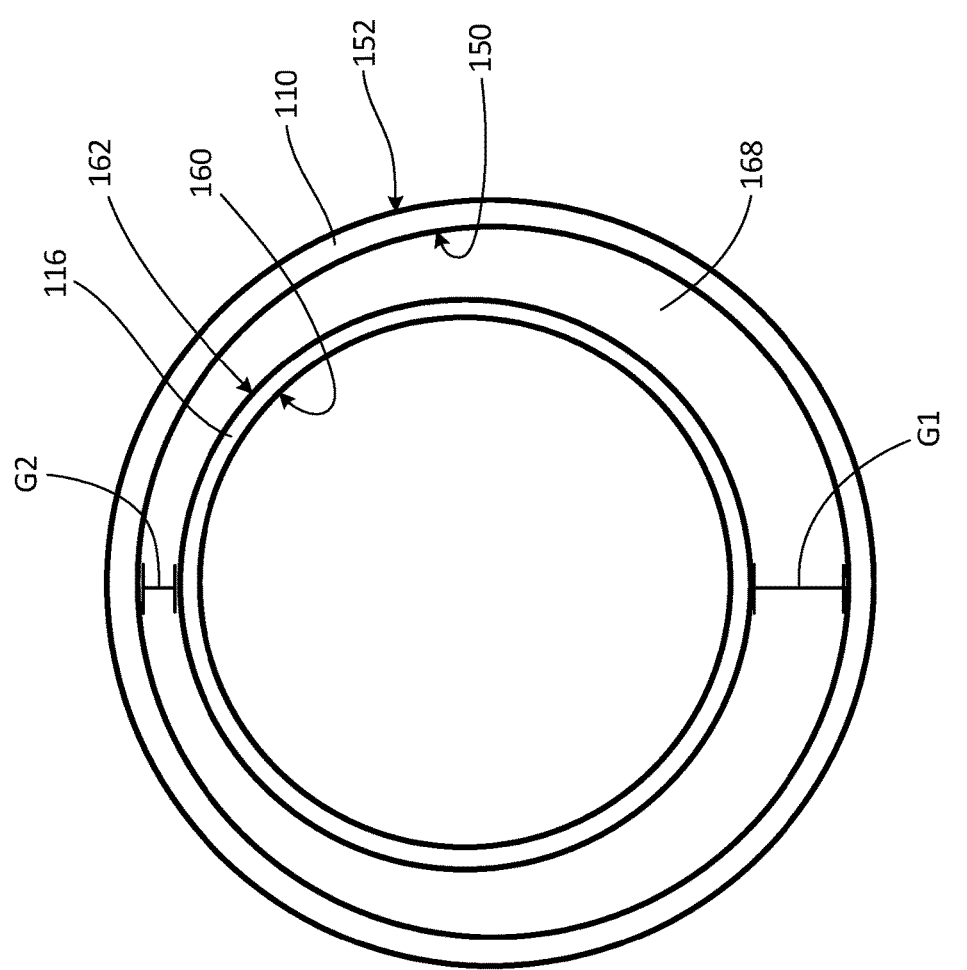

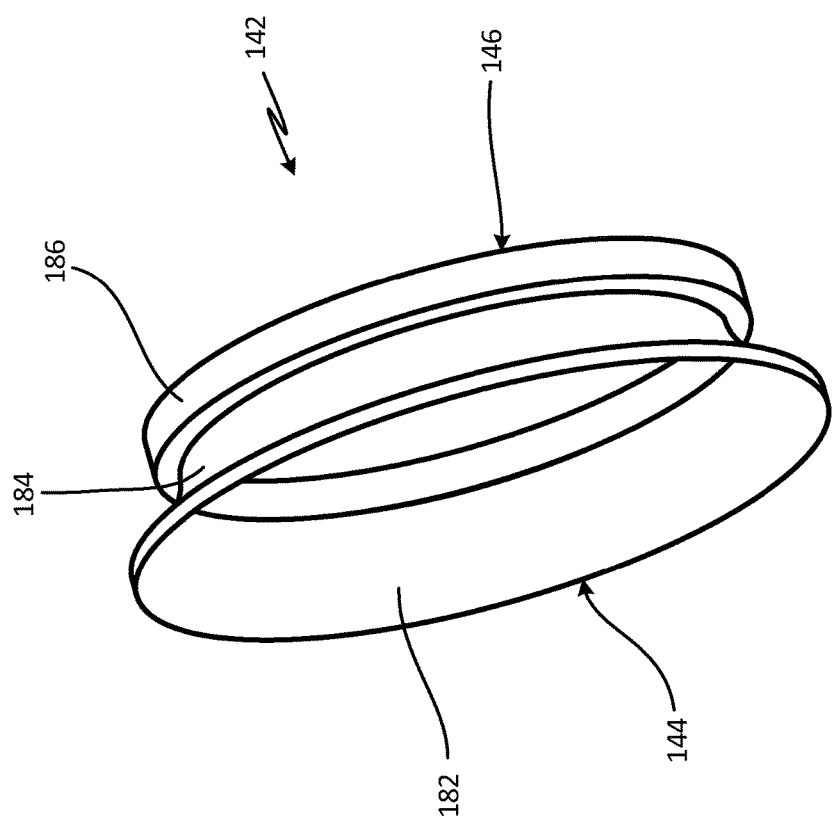

WATER EXTRACTOR

CROSS-REFERENCE TO RELATED APPLICATION(S)

This application is a continuation of U.S. application Ser. No. 15/647,505, filed on Jul. 12, 2017, and entitled "Water Extractor," the disclosure of which is incorporated by reference in its entirety.

BACKGROUND

The present disclosure relates to environmental control systems. More specifically, the present disclosure relates to a water extractor for an environmental control system.

Environmental control systems in aircraft condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the initial ambient air temperature is very low. Thus, under most conditions, heat must be removed from air by the environmental control system before the air is delivered to the aircraft cabin.

Environmental control systems can include cabin air compressors to compress ambient air for use in the environmental control system. Further, air cycle machines can be included to condition the air. Air cycle machines typically include a compressor to compress the air and at least one turbine to expand the compressed air. As the air is conditioned in the environmental control system, it will flow through heat exchangers and condensers to be cooled. The air flowing through the environmental control system can accumulate water during the conditioning of the air. A water extractor is included in the environmental control system to extract water from the air.

SUMMARY

A water extractor includes an outer duct with an inlet and an outlet, and an inner duct with an inlet and an outlet. The inner duct is positioned in the outer duct. The water extractor further includes a gap between the inner duct and the outer duct. The gap is tapered between a first position and a second position.

A water extractor includes a swirler vane assembly including a body portion with an inlet and an outlet, and turning vanes positioned in the body portion adjacent to the inlet. The water extractor further includes an outer duct with an inlet and an outlet, and an inner duct with an inlet and an outlet. The inlet of the outer duct is connected to the outlet of the swirler vane assembly. The inner duct is positioned in the outer duct. The water extractor further includes an outer extractor assembly including a first body portion, a second body portion connected to the first body portion, an inlet in the first body portion, an outlet in the second body portion, and diffuser vanes positioned in the first body portion and the second body portion. The inlet to the outer extractor assembly is connected to the outlet of the outer duct. The water extractor further includes a straight ejector duct including an inlet and an outlet, and a diffuser duct including an inlet and an outlet. The straight ejector duct is positioned in the outer extractor assembly. The inlet of the straight ejector duct is connected to the outlet of the inner duct. The diffuser duct is positioned in the outer extractor assembly. The outlet of the diffuser duct is connected to the outer extractor assembly. The water extractor further includes a gap between the inner duct and the outer duct. The gap is tapered between a first position and a second position.

BRIEF DESCRIPTION OF THE DRAWINGS

FIG. 5B is a cross-sectional view of the inner duct and the outer duct of the water extractor taken along line 5B-5B of FIG. 5A.

FIG. 7A is a perspective view of a diffuser duct of the water extractor.

DETAILED DESCRIPTION

Figure 1A:
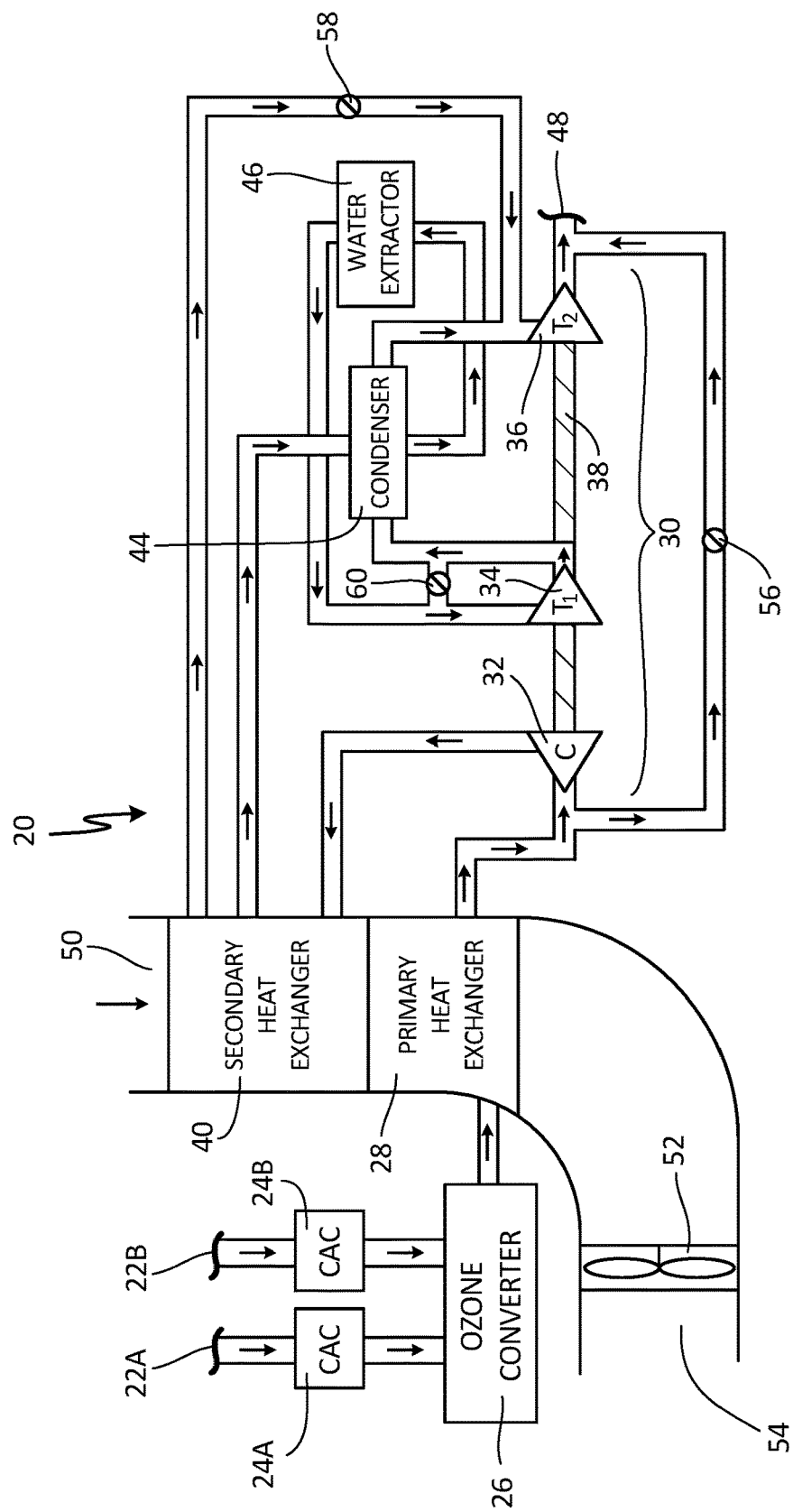
FIG. 1A is a schematic of an environmental control system.
Figure 1B:
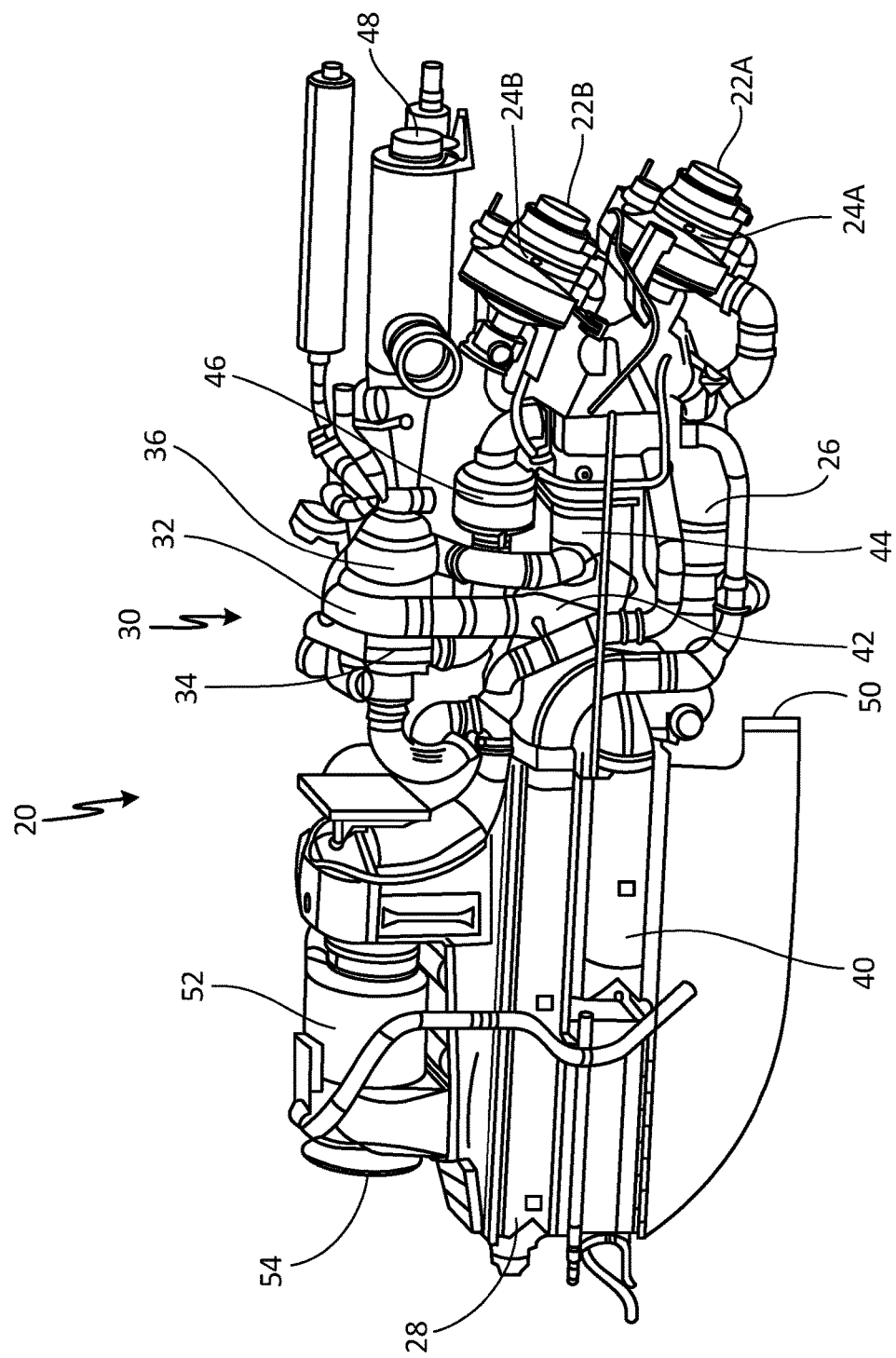
FIG. 1B is a perspective view of the environmental control system of FIG. 1A.

FIG. 1A is a schematic of environmental control system 20. FIG. 1B is a perspective view of environmental control system 20. Environmental control system 20 includes inlets 22A and 22B, cabin air compressors (CAC) 24A and 24B, ozone converter 26, primary heat exchanger 28, air cycle machine 30, compressor (C) 32, first turbine ($T_1$) 34, second turbine ($T_2$) 36, shaft 38 (shown in FIG. 1A), secondary heat exchanger 40, condenser 44, water extractor 46, pack outlet 48, ram air inlet 50, ram air fan 52, ram air outlet 54, bypass valve 56 (shown in FIG. 1A), economy cooling valve 58 (shown in FIG. 1A), and low limit valve 60 (shown in FIG. 1A).

Inlets 22A and 22B are connected to cabin air compressors 24A and 24B, respectively. Cabin air compressors 24A and 24B are connected to ozone converter 26 with a duct. Ozone converter 26 is connected to primary heat exchanger 28 with a duct. Primary heat exchanger 28 is connected to air cycle machine 30 with a duct. Air cycle machine 30 includes compressor 32, first turbine 34, and second turbine 36 mounted on shaft 38. Air cycle machine 30 is connected to secondary heat exchanger 40, condenser 44, and water extractor 46 with ducts. Air cycle machine 30 is further connected to pack outlet 48 with a duct. Ram air inlet 50 is connected to ram air fan 52 that is connected to ram air outlet 54.

Environmental control system 20 can be mounted to a pressure vessel of an aircraft and works to supply conditioned air to the aircraft cabin at the proper temperature and pressure. Ambient air is ingested through an opening on the aircraft and travels through a duct (not shown) to inlets 22A and 22B and to ram air inlet 50. The air that flows through ram air inlet 50 is drawn across primary heat exchanger 28 and secondary heat exchanger 40 with ram air fan 52. The air in ram air fan 52 is used to cool the air flowing through primary heat exchanger 28 and secondary heat exchanger 40. The used ram air is then dumped overboard through ram air outlet 54.

The air that flows through inlets 22A and 22B flows into cabin air compressors 24A and 24B, respectively. Cabin air compressors 24A and 24B include a motor and a compressor to compress ambient air. The compressed air then flows through ozone converter 26 to primary heat exchanger 28. Primary heat exchanger 28 cools the compressed air using the cooling airflow from ram air fan 52. The cooled air then flows to air cycle machine 30. Air cycle machine 30 includes compressor 32, first turbine 34, and second turbine 36 that are all mounted to shaft 38. The cooled air from primary heat exchanger 28 first flows through compressor 32 of air cycle machine 30. Compressor 32 includes a compressor rotor mounted to shaft 38 that is rotated with shaft 38 to further compress the air flowing through compressor 32 of air cycle machine 30. The compressed air from compressor 32 then flows to secondary heat exchanger 40 where it is further cooled with ram air that is pulled across secondary heat exchanger 40 with ram air fan 52.

The cooled air from secondary heat exchanger 40 then flows through a duct to condenser 44. Condenser 44 condenses the cooled air by lowering the air temperature. The condensed air then flows through a duct to water extractor 46, which collects the condensed water out of the air. The air then flows from water extractor 46 through first turbine 34 of air cycle machine 30. First turbine 34 also includes a first turbine rotor mounted on shaft 38. Energy is extracted from the air expanding through first turbine 34 of air cycle machine 30 to drive shaft 38.

Air from first turbine 34 then flows back through condenser 44. Air from condenser 44 then flows through second turbine 36 of air cycle machine 30. Second turbine 36 also includes a second turbine rotor mounted on shaft 38. Energy is extracted from the air expanding through second turbine 36 of air cycle machine 30 to drive shaft 38. Air from second turbine 36 then flows through pack outlet 48 to be delivered to the aircraft cabin.

Environmental control system 20 further includes bypass valve 56, economy cooling valve 58, and low limit valve 60. Bypass valve 56 connects an inlet of compressor 32 to an outlet of second turbine 36. Bypass valve 56 allows air that has flowed through primary heat exchanger 28 to flow to pack outlet 48, bypassing air cycle machine 30, secondary heat exchanger 40, condenser 44, and water extractor 46. Economy cooling valve 58 connects an outlet of second heat exchanger 40 to an inlet of second turbine 36. Economy cooling valve 58 allows air that has flowed through secondary heat exchanger 40 to flow to second turbine 36, bypassing condenser 44, water extractor 46, and first turbine 34 of air cycle machine 30. Low limit valve 60 connects an inlet of first turbine 34 to an outlet of first turbine 34. Low limit valve 60 allows air to flow from water extractor 46 through condenser 44, bypassing first turbine 34 of air cycle machine 30. First turbine 34 of air cycle machine 30 can be bypassed to control the temperature of the air entering condenser 44. Bypass valve 56, economy cooling valve 58, and low limit valve 60 can be moved between an open and closed position to direct air through environmental control system 20.

Figure 2A:
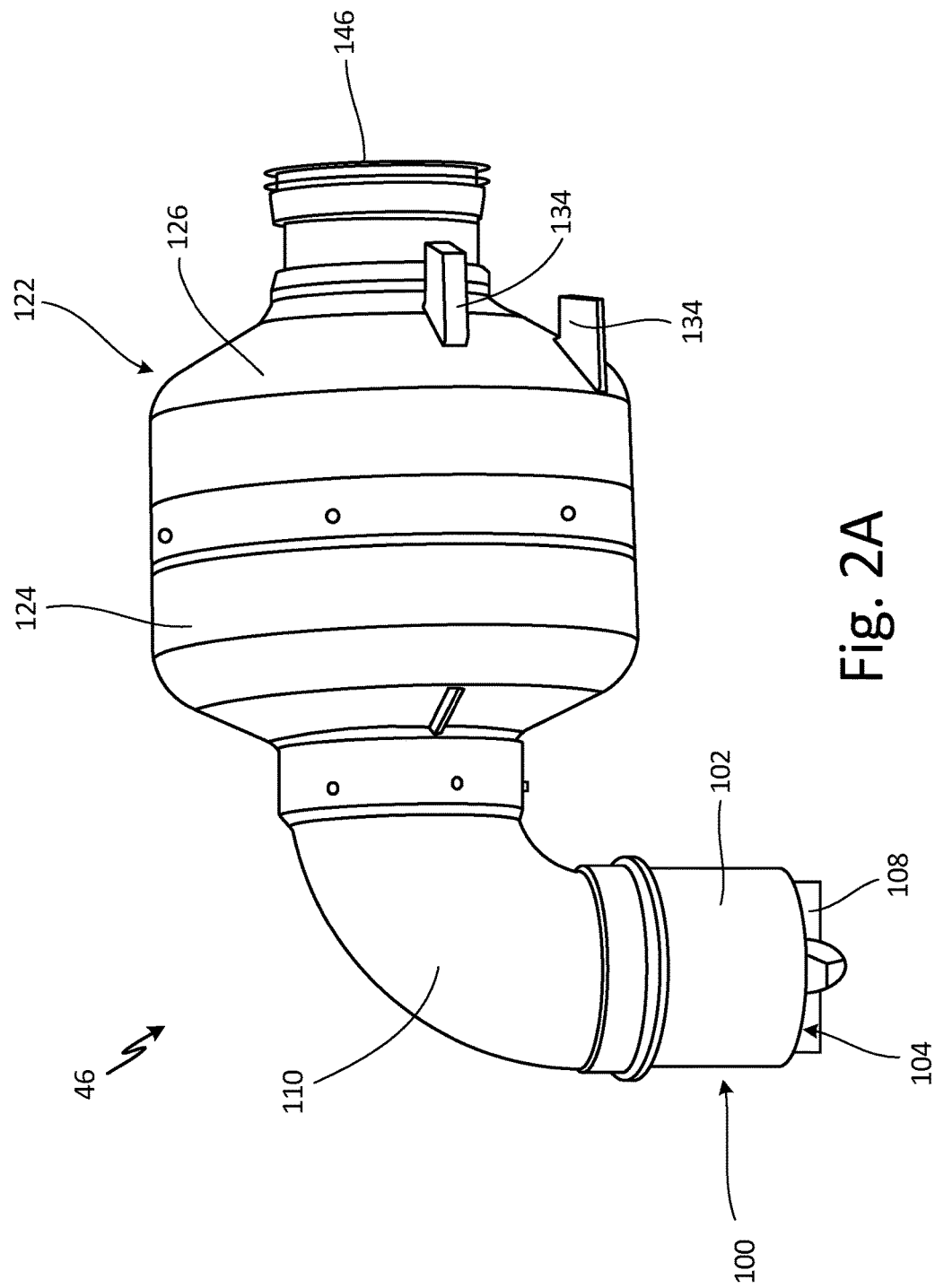
FIG. 2A is a side view of a water extractor.
Figure 2B:
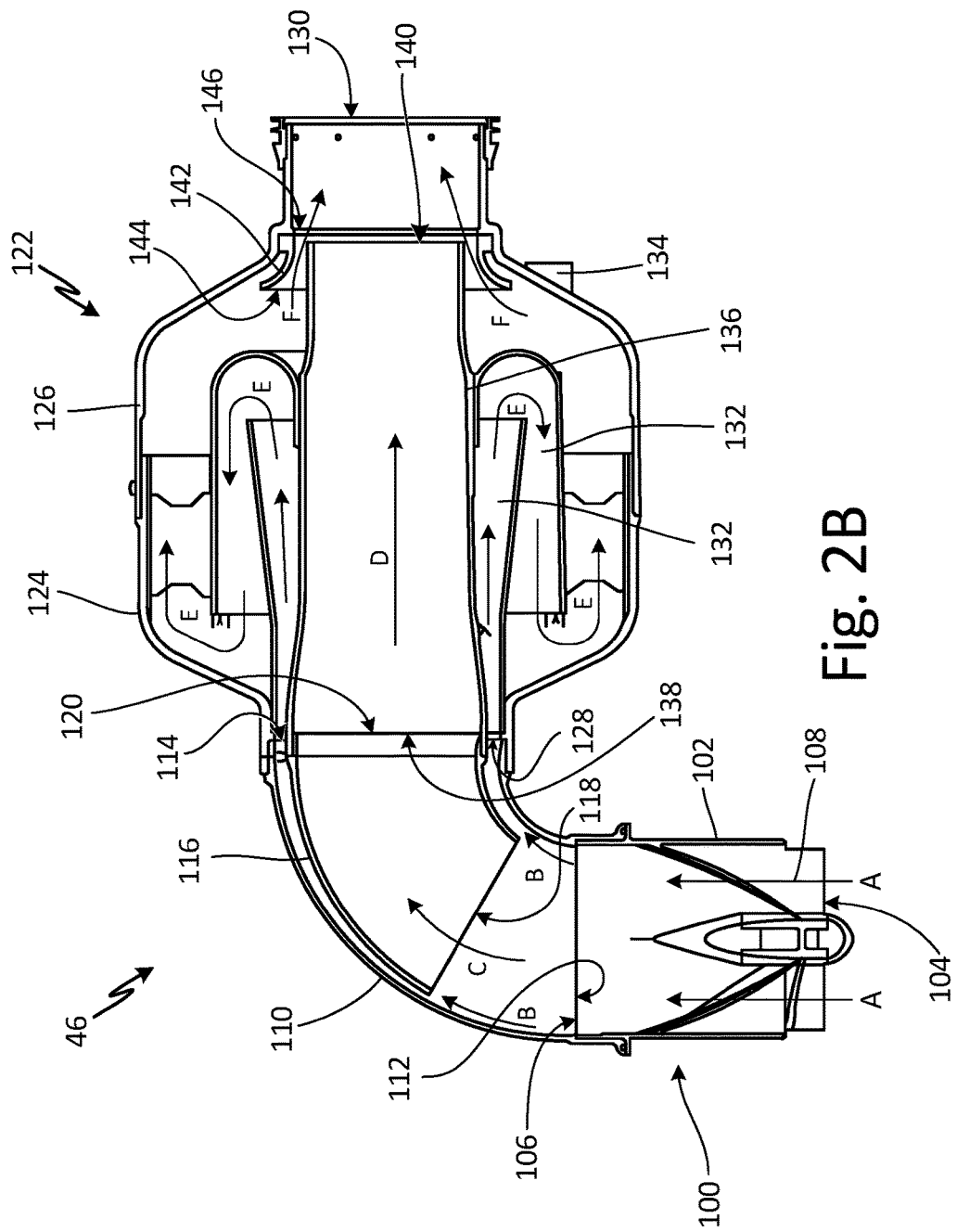
FIG. 2B is a cross-sectional view of the water extractor of FIG. 2A.

FIG. 2A is a side view of water extractor 46. FIG. 2B is a cross-sectional view of water extractor 46. Water extractor 46 includes swirler vane assembly 100, body 102, inlet 104, outlet 106 (shown in FIG. 2B), turning vanes 108, outer duct 110, inlet 112 (shown in FIG. 2B), outlet 114 (shown in FIG. 2B), inner duct 116 (shown in FIG. 2B), inlet 118 (shown in FIG. 2B), outlet 120 (shown in FIG. 2B), outer extractor assembly 122, first body portion 124, second body portion 126, inlet 128 (shown in FIG. 2B), outlet 130 (shown in FIG. 2B), diffuser vanes 132 (shown in FIG. 2B), drain ports 134, straight ejector duct 136 (shown in FIG. 2B), inlet 138 (shown in FIG. 2B), outlet 140 (shown in FIG. 2B), diffuser duct 142 (shown in FIG. 2B), inlet 144 (shown in FIG. 2B), and outlet 146.

Water extractor 46 includes swirler vane assembly 100 at an inlet to water extractor 46. Swirler vane assembly 100 includes body 102 that forms a housing portion of swirler vane assembly 100. Body 102 is a straight housing that extends from inlet 104 to outlet 106 of swirler vane assembly 100. Turning vanes 108 are positioned in body 102 of swirler vane assembly 100 adjacent to inlet 104.

Swirler vane assembly 100 is connected to outer duct 110. Outer duct 110 is a curved duct that extends from inlet 112 to outlet 114. Inlet 112 of outer duct 110 is connected to outlet 106 of swirler vane assembly 100. Inner duct 116 is positioned in outer duct 110. Inner duct is a curved duct that extends from inlet 118 to outlet 120.

Outer duct 110 is connected to outer extractor assembly 122. Outer extractor assembly 122 includes first body portion 124 and second body portion 126 that form a housing of outer extractor assembly 122. Inlet 128 to outer extractor assembly 122 is positioned in first body portion 124 and outlet 130 to outer extractor assembly 122 is positioned in second body portion 126. Diffuser vanes 132 are positioned in first body portion 122 and second body portion 124 of outer extractor assembly 122. Drain ports 134 are positioned in second body portion 124 of outer extractor assembly 122.

Straight ejector duct 136 is connected to inner duct 116 and is positioned in first body portion 124 and second body portion 126 of outer extractor assembly 122. Straight ejector duct 136 extends from inlet 138 to outlet 140. Inlet 138 of straight ejector duct 136 is connected to outlet 120 of inner duct 116. Diffuser duct 142 is positioned in and connected to second body portion 126 of outer extractor assembly 122. Diffuser duct 142 extends from inlet 144 to outlet 146. Diffuser duct 142 has a curved shape.

Air enters water extractor 46 through inlet 104 of swirler vane assembly 100, as indicated by arrows A in FIG. 2B. As the air flows through swirler vane assembly 100 it will flow past turning vanes 108. Turning vanes 108 will throw the water droplets that are mixed with the air outward by centrifugal forces created by turning vanes 108. The air will flow from swirler vane assembly 100 to outer duct 110. The air with the water droplets will then flow along the inner surface of outer duct 100 and through the gap between inner duct 116 and outer duct 110, as indicated by arrows B in FIG. 2B. The rest of the air will flow through inner duct 116, as indicated by arrow C in FIG. 2B.

The air that flows through inner duct 116 will then flow through straight ejector duct 136, as indicated by arrow D in FIG. 2B. The air with the water droplets will flow into outer extractor assembly 122, as indicated by arrows E in FIG. 2B. The air with the water droplets will flow around diffuser vanes 132 in outer extractor assembly 122, as indicated by arrows E in FIG. 2B. Diffuser vanes 132 will slow the air containing the water droplets as it flows through outer extractor assembly 122, allowing the water droplets to fall to the bottom of the outer extractor assembly 122. The water droplets can then drain out of water extractor 46 through drain port 134 in outer extractor assembly 122.

The air in outer extractor assembly 122 can then flow past diffuser duct 142, as indicated by arrows F in FIG. 2B. There is a gap between diffuser duct 142 and second body portion 126 of outer extractor assembly 122 to allow remaining water particles in the air to be trapped in the gap and drained from outer extractor assembly 122. The air that flows through diffuser duct 142 will remix with the air that has flown through straight ejector duct 136, as indicated by arrows F in FIG. 2B. The remixed air can then exit water extractor 46 through outlet 130.

Water extractor 46 allows water droplets to be collected from the air flowing through water extractor 46 and thus through environmental control system 20 (see FIGS. 1A-1B). Reducing the amount of moisture in the air flowing through environmental control system 20 helps to dehumidify the cabin supply air to meet supply humidity and free moisture requirements while also serving to prevent damage to air cycle machine 30 of environmental control system 20. Further, reducing the amount of moisture in the air flowing through environmental control system 20 enhances performance of environmental control system 20 and provides better cabin and cockpit cooling, heating, and comfort. Water extractor 46 also minimizes the pressure drop in water extractor 46 to minimize the pressure drop in environmental control system 20 to increase the efficiency of environmental control system 20.

Figure 3:
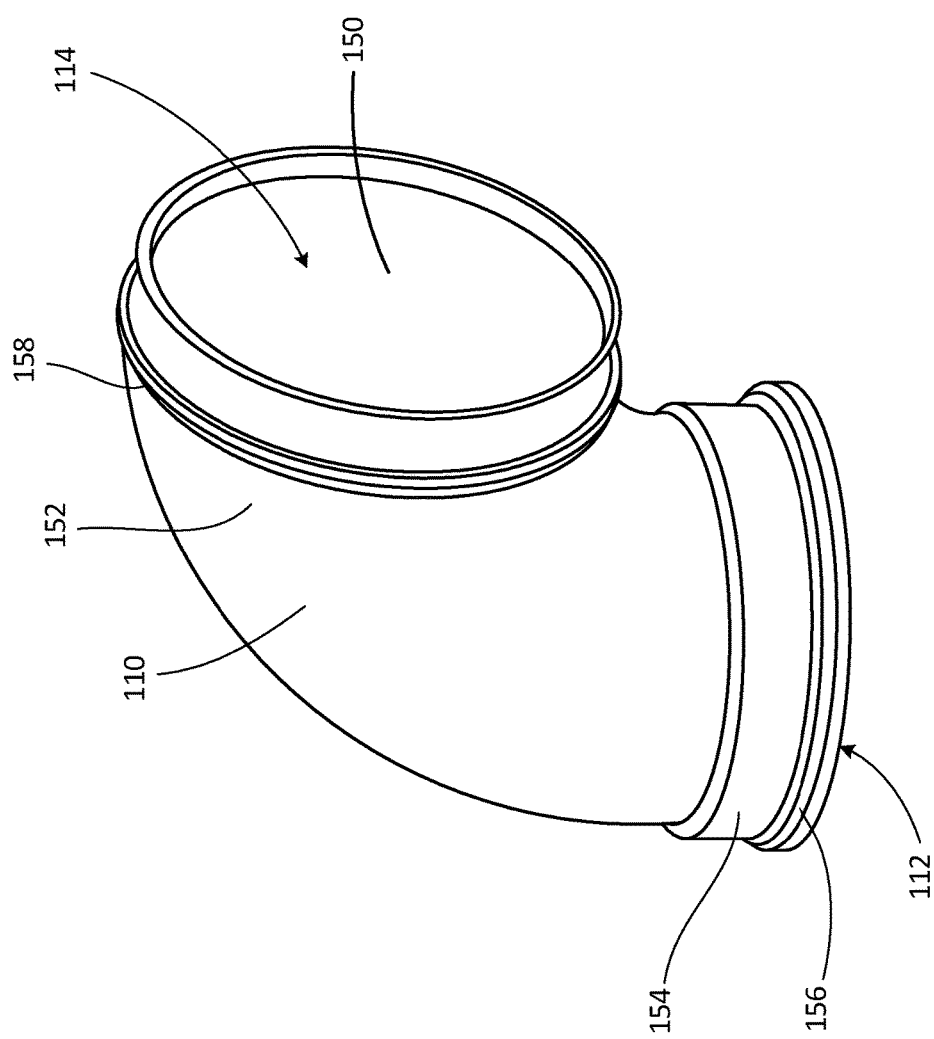
FIG. 3 is a perspective view of an outer duct of the water extractor.
Figure 4:
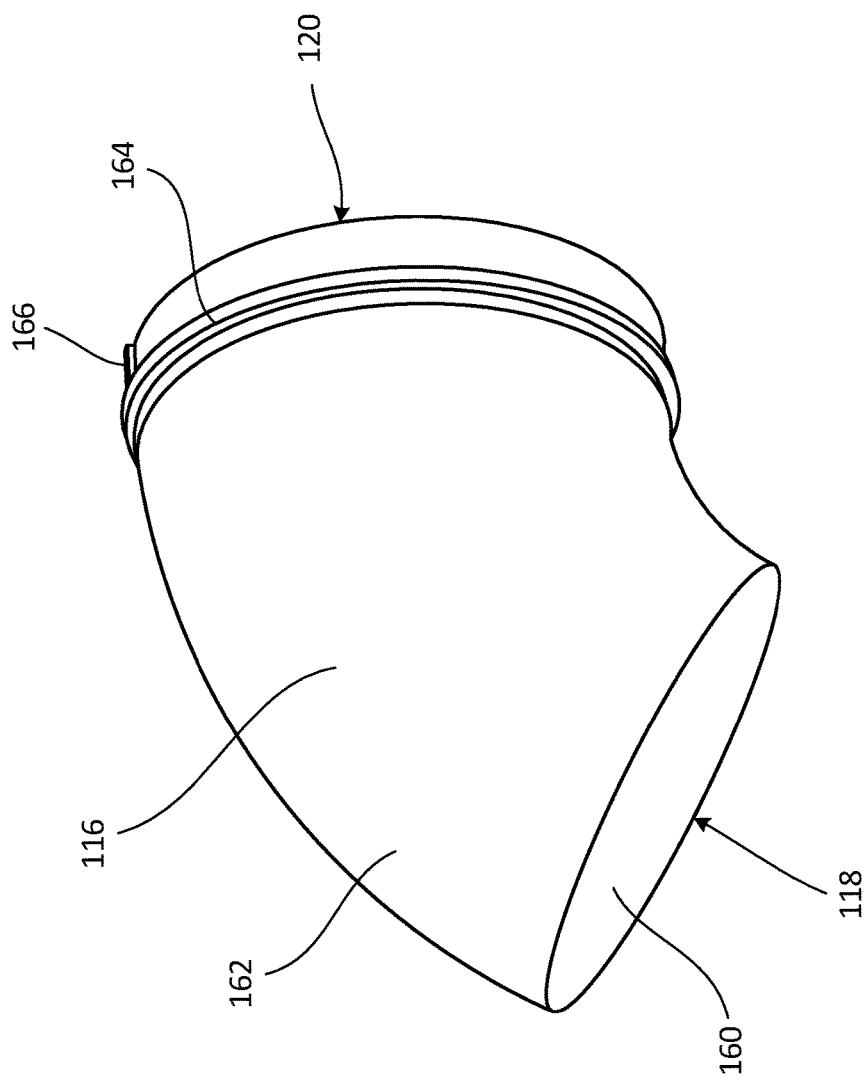
FIG. 4 is a perspective view of an inner duct of the water extractor.
Figure 5A:
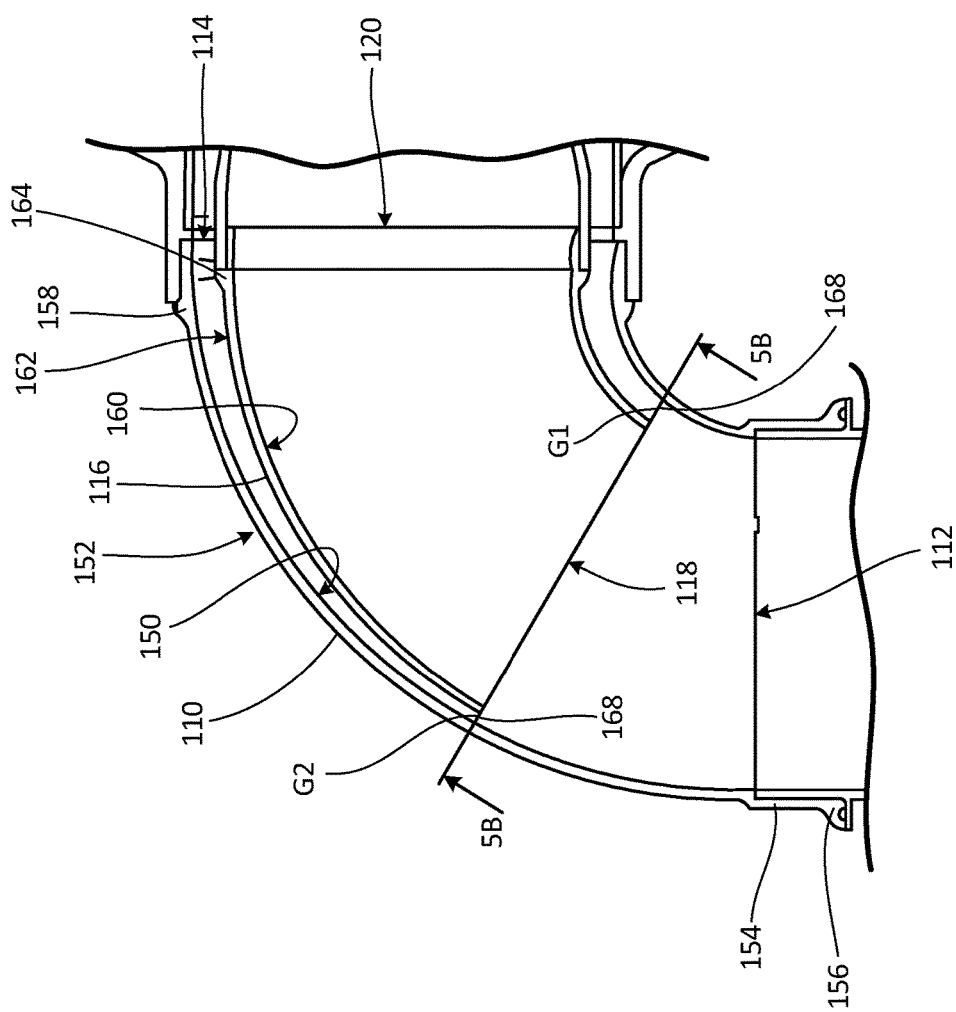
FIG. 5A is a cross-sectional view of the inner duct and the outer duct of the water extractor.

FIG. 3 is a perspective view of outer duct 110 of water extractor 46. FIG. 4 is a perspective view of inner duct 116 of water extractor 46. FIG. 5A is a cross-sectional view of inner duct 116 and outer duct 110 of water extractor 46. FIG. 5B is a cross-sectional view of inner duct 116 and outer duct 110 of water extractor 46 taken along line 5B-5B of FIG. 5A. FIGS. 3-5B will be discussed together. Outer duct 110 (shown in FIGS. 3 and 5A-5B) includes inlet 112 (shown in FIGS. 3 and 5A), outlet 114 (shown in FIGS. 3 and 5A), inner surface 150 (shown in FIGS. 3 and 5A-5B), outer surface 152 (shown in FIGS. 3 and 5A-5B), inlet collar 154 (shown in FIGS. 3 and 5A), inlet rim 156 (shown in FIGS. 3 and 5A), and outlet rim 158 (shown in FIGS. 3 and 5A). Inner duct 116 (shown in FIGS. 4 and 5A-5B) includes inlet 118 (shown in FIGS. 4 and 5A), outlet 120 (shown in FIGS. 4 and 5A), inner surface 160 (shown in FIGS. 4 and 5A-5B), outer surface 162 (shown in FIGS. 4 and 5A-5B), outlet rim 164 (shown in FIGS. 4 and 5A), and flange 166 (shown in FIG. 4). Also shown in FIGS. 5A-5B is gap 168, gap dimension G1, and gap dimension G2.

As shown in FIG. 3, outer duct 110 is a curved duct that extends from inlet 112 to outlet 114. Outer duct 110 includes inner surface 150 on an interior of outer duct 110 and outer surface 152 on an exterior of outer duct 110. Inlet collar 154 is positioned adjacent to inlet 112 of outer duct 110. Inlet collar 154 is a ring that is stepped out from outer duct 110 to form a step along inner surface 150 of outer duct 110. Inlet rim 156 is a raised ring that is positioned on inlet collar 154 of outer duct 110 adjacent to inlet 112. Inlet collar 154 and inlet rim 156 are used to connect outlet 106 of swirler vane assembly 100 (see FIGS. 2A-2B) to inlet 112 of outer duct 110. Outlet rim 158 is a raised ring that is positioned on outer surface 152 of outer duct 110 adjacent to outlet 114. Outlet rim 158 is used to connect inlet 128 of outer extractor assembly 122 (see FIGS. 2A-2B) to outlet 114 of outer duct 110.

As shown in FIG. 4, inner duct 116 is a curved duct that extends from inlet 118 to outlet 120. Inner duct 116 includes inner surface 160 on an interior of inner duct 116 and outlet surface 162 on an exterior of inner duct 116. Outlet rim 164 is a raised ring that is positioned on outer surface 162 of inner duct 116 adjacent to outlet 120. Outlet rim 164 is used to connect inlet 138 of straight ejector duct 136 (see FIGS. 2A-2B) to outlet 120 of inner duct 116. Flange 166 is positioned on outer surface 162 of inner duct 116 adjacent to outlet 120. Flange 166 is a raised surface that extends between outlet rim 164 and outlet 120 of inner duct 116. Flange 166 is a mistake-proofing feature. Inlet 138 of straight ejector duct 136 (see FIGS. 2A-2B) has a channel cut into it to accommodate flange 166, ensuring that inner duct 116 is correctly positioned with respect to straight ejector duct 136.

As shown in FIGS. 5A-5B, inner duct 116 is positioned in outer duct 110. Gap 168 is formed between outer surface 162 of inner duct 116 and inner surface 150 of outer duct 110. Gap 168 is positioned at inlet 118 of inner duct 116 and between inlet 112 and outlet 114 of outer duct 110. Gap 168 is tapered. Gap dimension G1 is the distance between inner duct 116 and outer duct 110 at a radially innermost section of the curve of inner duct 116 and outer duct 110. Gap dimension G2 is the distance between inner duct 116 and outer duct 110 at a radially outermost section of the curve of inner duct 116 and outer duct 110. Gap dimension G1 is greater than gap dimension G2. Gap 168 tapers between gap dimension G1 and gap dimension G2. The ratio of gap dimension G2 to gap dimension G1 is about 0.457.

Gap 168 between inner duct 116 and outer duct 110 is tapered so that gap 168 is larger at gap dimension G1 than gap dimension G2 to allow more water to flow between inner duct 116 and outer duct 110 through gap 168. Due to the curvature of inner duct 116 and outer duct 110, water tends to separate from the inner wall at the radially innermost section of the curve. Making gap 168 larger at gap dimension G1 allows for better capture of the water droplets which have separated from the inner wall at the radially innermost section of the curve and enables the water to flow through gap 168 between inner duct 116 and outer duct 110. Making gap 168 smaller at gap dimension G2 still allows the water accumulation at the radially outermost section of the curve to flow through gap 168 between inner duct 116 and outer duct 110.

Tapering gap 168 between gap dimension G1 and gap dimension G2 to account for areas of high water accumulation and low water accumulation allows water extractor 46 to efficiently extract the water droplets in the air flowing through water extractor 46. At the same time, tapering gap 168 between gap dimension G1 and gap dimension G2 does not create an excessive pressure drop in water extractor 46. If gap 168 had a consistently large gap dimension to account for the areas of high water accumulation, there were would an unnecessary pressure drop in water extractor 46 as a large gap dimension is not needed at areas of low water accumulation. Tapering gap 168 ensures that there is not an unnecessary pressure drop in water extractor 46 while also ensuring that water extractor 46 is efficiently extracting water from the air in water extractor 46.

Figure 6A:
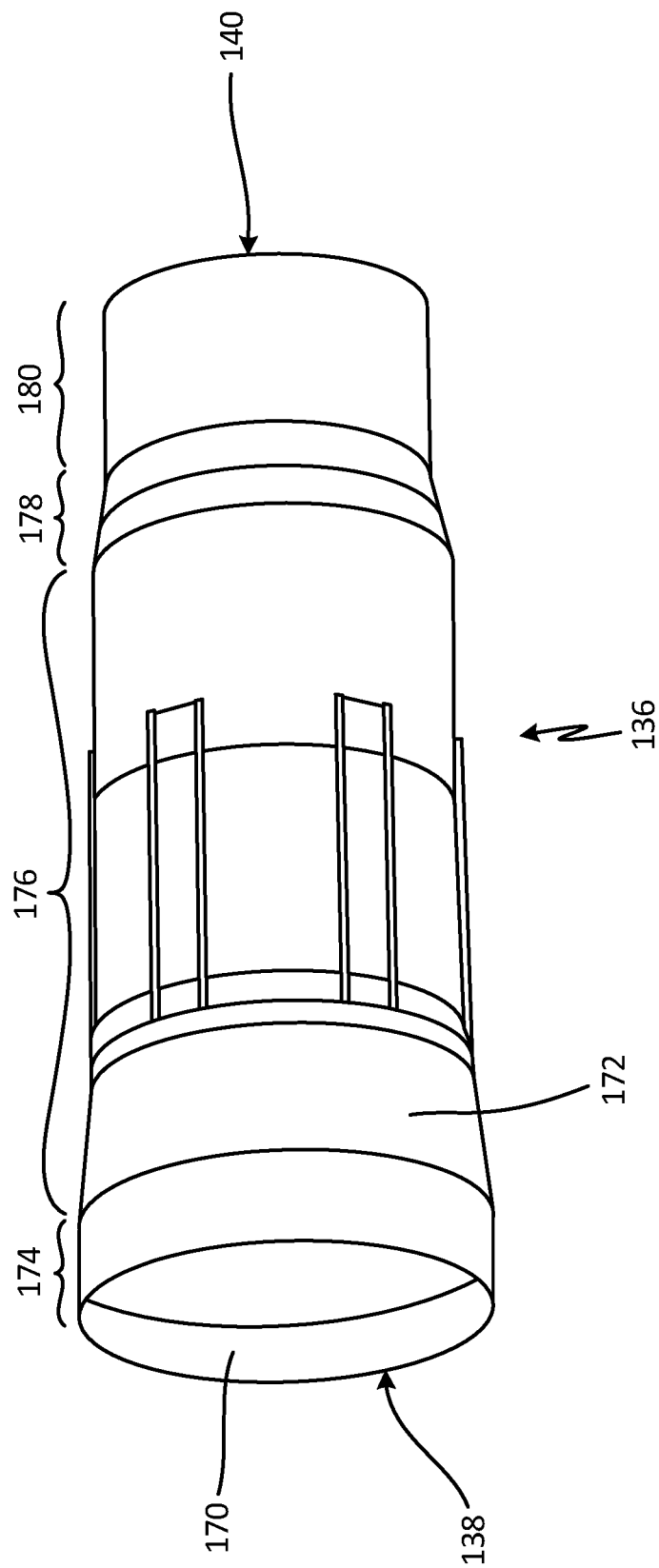
FIG. 6A is a perspective view of a straight ejector duct of the water extractor.
Figure 6B:
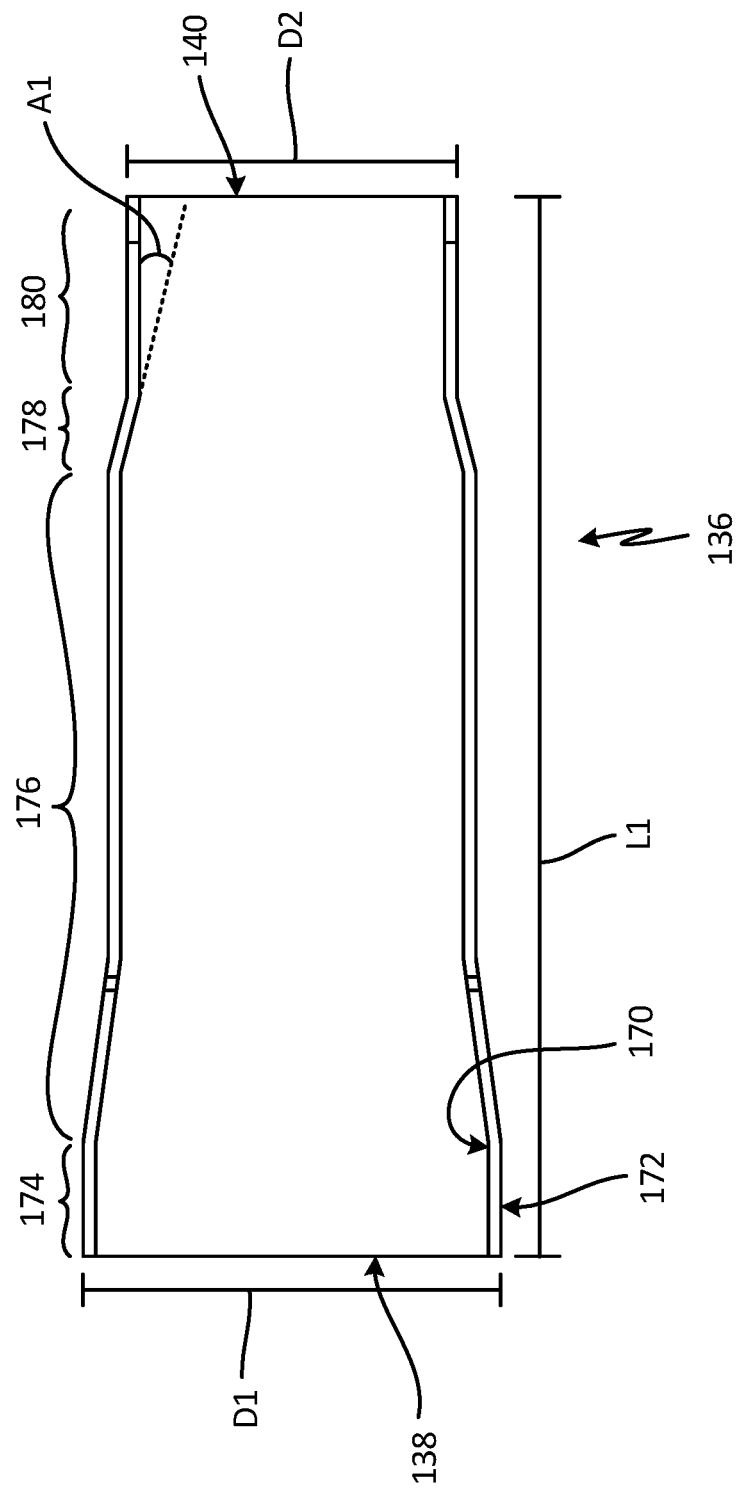
FIG. 6B is a cross-sectional view of the straight ejector duct of the water extractor.
Figure 7B:
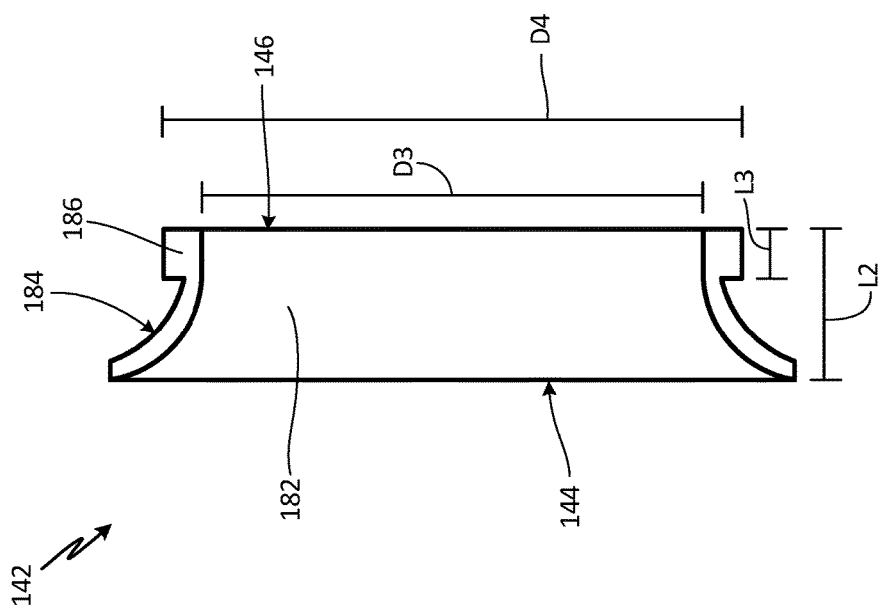
FIG. 7B is a cross-sectional view of the diffuser duct of the water extractor.
Figure 8:
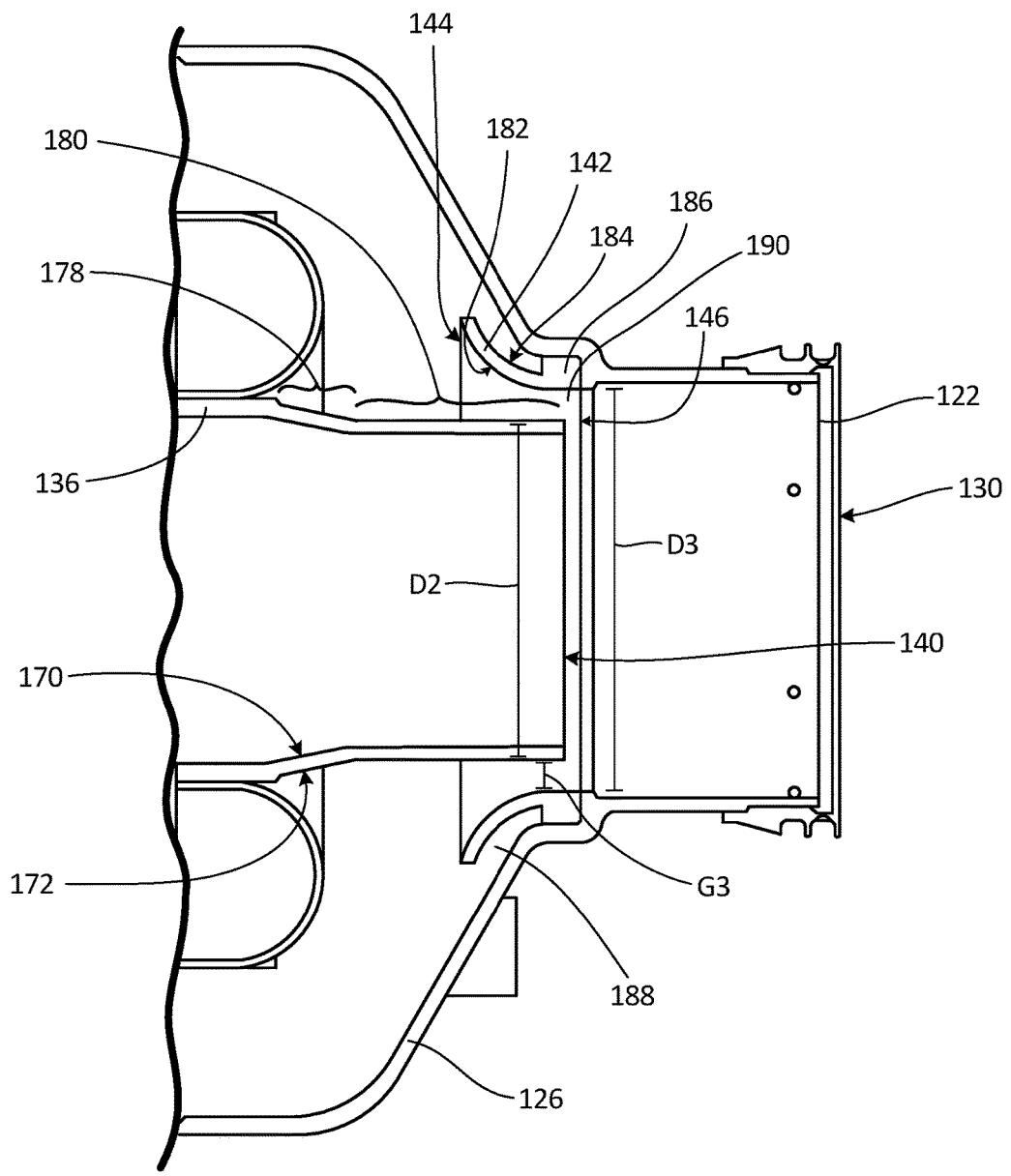
FIG. 8 is a cross-sectional view of the straight ejector duct and the diffuser duct of the water extractor.

FIG. 6A is a perspective view of straight ejector duct 136 of water extractor 46. FIG. 6B is a cross-sectional view of straight ejector duct 136 of water extractor 46. FIG. 7A is a perspective view of diffuser duct 142 of water extractor 46. FIG. 7B is a cross-sectional view of diffuser duct 142 of water extractor 46. FIG. 8 is a cross-sectional view of the straight ejector duct and the diffuser duct of the water extractor. FIGS. 6A-8 will be discussed together. Straight ejector duct 136 (shown in FIGS. 6A-6B and 8) includes inlet 138 (shown in FIGS. 6A-6B), outlet 140 (shown in FIGS. 6A-6B and 8), inner surface 170 (shown in FIGS. 6A-6B and 8), outer surface 172 (shown in FIGS. 6A-6B and 8), inlet section 174 (shown in FIGS. 6A-6B), tapering section 176 (shown in FIGS. 6A-6B), converging section 178 (shown in FIGS. 6A-6B and 8), and outlet section 180 (shown in FIGS. 6A-6B and 8). Diffuser duct 142 (shown in FIGS. 7A-7B and 8) includes inlet 144 (shown in FIGS. 7A-7B and 8), outlet 146 (shown in FIGS. 7A-7B and 8), inner surface 182 (shown in FIGS. 7A-7B and 8), outer surface 184 (shown in FIGS. 7A-7B and 8), and collar 186 (shown in FIGS. 7A-7B and 8). Shown in FIGS. 6A-6B is diameter D1, diameter D2 (also shown in FIG. 8), length L1, and angle A1. Shown in FIGS. 7A-7B is diameter D3 (also shown in FIG. 8), diameter D4, length L2, and length L3. Shown in FIG. 8 is water extractor assembly 122, second body portion 126, outlet 130, gutter 188, gap 190, and gap dimension G3.

As shown in FIGS. 6A-6B, straight ejector duct 136 extends from inlet 138 to outlet 140. Straight ejector duct 136 includes inner surface 170 on an interior of straight ejector duct 136 and outer surface 172 on an exterior of straight ejector duct 136. Straight ejector duct 136 includes inlet section 174 adjacent to inlet 138, tapering section 176, converging section 178, and outlet section 180 adjacent to outlet 140. Inlet section 174 is a straight duct portion extending from inlet 138. Tapering section 176 tapers from inlet end 174 to converging section 178. Converging section 178 converges from tapering section 176 to outlet section 180. Outlet section 180 is a straight duct portion extending from outlet 140.

Inlet section 174 of straight ejector duct 136 had an outer diameter D1. Outlet section 178 of straight ejector duct 136 has an outer diameter D2. The ratio of outer diameter D1 to outer diameter D2 is between 1.263 and 1.2935. Straight ejector duct 136 has a length L1. The ratio of length L1 to outer diameter D2 is between 3.2378 and 3.3048. Converging section 178 is angled at angle A1 with respect to outlet end 180. Angle A1 is about 13.87 degrees.

As shown in FIGS. 7A-7B, diffuser duct 142 extends from inlet 144 to outlet 146. Diffuser duct 142 includes inner surface 182 on an interior of diffuser duct 142 and outer surface 184 on an exterior of diffuser duct 142. Collar 186 is positioned on outer surface 184 of diffuser duct 142 adjacent to outlet 146 of diffuser duct 142. Diffuser duct 142 has a curved shape from inlet 144 to collar 186 of diffuser duct 142.

Inner surface 182 of diffuser duct 142 has inner diameter D3 at outlet 146. Outer surface 184 of diffuser duct 142 has outer diameter D4 at collar 184. The ratio of inner diameter D3 to outer diameter D4 is between 0.9072 and 0.9290. Diffuser duct 142 has a length L2 from inlet 144 to outlet 146. The ratio of length L2 to inner diameter D3 is between 0.2686 and 0.2844. Collar 184 has a length L3. The ratio of length L3 to inner diameter D3 is between 0.0838 and 0.0973.

As shown in FIG. 8, diffuser duct 142 is positioned so that collar 186 abuts second body portion 126 of outer extractor assembly 122. Diffuser duct 142 curves upward along second body portion 126 of outer extractor assembly 122 to form gutter 188 between diffuser duct 142 and second body portion 126 of outer extractor assembly 122. As air flows through outer extractor assembly 122 to remix with the air in straight ejector duct 136, any remaining water droplets in the air in outer extractor assembly 122 can be captured in gutter 188 between diffuser duct 142 and second body portion 126 of outer extractor assembly 122.

Also as shown in FIG. 8, outlet section 180 of straight ejector duct 136 is partially positioned in diffuser duct 142. Specifically, outlet 140 of straight ejector duct 136 is positioned adjacent to collar 186 in diffuser duct 142. Gap 190 is formed between outer surface 172 of straight ejector duct 136 and inner surface 182 of diffuser duct 142. Gap 190 is positioned at outlet 140 of straight ejector duct 136 and collar 186 of diffuser duct 142. Gap dimension G3 is the distance between outer diameter D2 of straight ejector duct 136 and inner diameter D3 of diffuser duct 142. The ratio of outer diameter D2 to inner diameter D3 is between 0.7795 and 0.8017. Outer diameter D2 is about 17% to 21% smaller than inner diameter D3. The ratio of gap dimension G3 to outer diameter D2 and the ratio of gap dimension G3 to inner diameter D3 is between 0.1237 and 0.1415.

Gap 190 is sized to create the correct differential pressure between the air flowing from outer extractor assembly 122 through diffuser duct 146 and the air flowing straight ejector duct 136. Creating the correct differential pressure between the air flowing from outer extractor assembly 122 through diffuser duct 146 and the air flowing straight ejector duct 136 will ensure that the air flowing through outer extractor assembly 122 will be driven through diffuser duct 146 to mix with the air in straight ejector duct 136. The air in outer extractor assembly 122 is slowed down as it flows around diffuser vanes 132 (see FIG. 2B) so that the water in the air can be separated from the air and drained from outer extractor assembly 122. To drive the slower air out of outer extractor assembly 122, the correct differential pressure needs to be created between the air flowing from outer extractor assembly 122 through diffuser duct 146 and the air flowing straight ejector duct 136. Gap 190 is sized to ensure that the correct differential pressure is created to drive the air flowing from outer extractor assembly 122 through diffuser duct 146 to mix with the air flowing straight ejector duct 136 and to dispel the air through outlet 130 of outer extractor assembly 122.

As seen above in FIGS. 2A-8, water extractor 46 is designed to maximize the amount of water that can be extracted out of the air flowing through water extractor 46 and to minimize pressure drop in water extractor 46 to ensure water extractor 46 is operating efficiently. Gap 168 between inner duct 116 and outer duct 110 is tapered to maximize the amount of water that can be extracted out of the air flowing through water extractor 46 and to minimize pressure drop in water extractor 46. Gutter 188 between diffuser duct 142 and outer extractor assembly 122 is provided to capture water in outer extractor assembly 122 that otherwise would have been passed through water extractor 46. Outer diameter D2 of straight ejector duct 136 is sized to be 17% to 21% smaller than inner diameter D3 of diffuser duct 146 to have the correct pressure differential between straight ejector duct 136 and diffuser duct 146 to pull the air in diffuser duct 146 through to mix with the air in straight ejector duct 136.

Discussion of Possible Embodiments

The following are non-exclusive descriptions of possible embodiments of the present invention.

A water extractor includes an outer duct with an inlet and an outlet, and an inner duct with an inlet and an outlet. The inner duct is positioned in the outer duct. The water extractor further includes a gap between the inner duct and the outer duct. The gap is tapered between a first position and a second position.

The water extractor of the preceding paragraph can optionally include, additionally and/or alternatively, any one or more of the following features, configurations and/or additional components:

Wherein the gap between the inner duct and the outer duct is positioned at the inlet to the inner duct and between the inlet and the outlet of the outer duct.

Wherein the inner duct and the outer duct are curved ducts.

Wherein the first position is a radially innermost section of the curve.

Wherein the second position is a radially outermost section of the curve.

Wherein a gap dimension G1 at the first position is greater than a gap dimension G2 at the second position.

Wherein a ratio of the gap dimension G2 to the gap dimension G1 is about 0.457.

The water extractor further includes a swirler vane assembly including a body portion with an inlet and an outlet, and turning vanes positioned in the body portion adjacent to the inlet, wherein the outlet of the swirler vane assembly is connected to the inlet of the outer duct; an outer extractor assembly including a first body portion, a second body portion connected to the first body portion, an inlet in the first body portion, an outlet in the second body portion, and diffuser vanes positioned in the first body portion and the second body portion, wherein the inlet of the outer extractor assembly is connected to the outlet of the outer duct; a straight ejector duct including an inlet and an outlet, wherein the straight ejector duct is positioned in the outer extractor assembly, and wherein the inlet of the straight ejector duct is connected to the outlet of the inner duct; and a diffuser duct including an inlet and an outlet, wherein the diffuser duct is positioned in the outer extractor assembly, and wherein the outlet of the diffuser duct is connected to the outer extractor assembly.

A water extractor includes a swirler vane assembly including a body portion with an inlet and an outlet, and turning vanes positioned in the body portion adjacent to the inlet. The water extractor further includes an outer duct with an inlet and an outlet, and an inner duct with an inlet and an outlet. The inlet of the outer duct is connected to the outlet of the swirler vane assembly. The inner duct is positioned in the outer duct. The water extractor further includes an outer extractor assembly including a first body portion, a second body portion connected to the first body portion, an inlet in the first body portion, an outlet in the second body portion, and diffuser vanes positioned in the first body portion and the second body portion. The inlet to the outer extractor assembly is connected to the outlet of the outer duct. The water extractor further includes a straight ejector duct including an inlet and an outlet, and a diffuser duct including an inlet and an outlet. The straight ejector duct is positioned in the outer extractor assembly. The inlet of the straight ejector duct is connected to the outlet of the inner duct. The diffuser duct is positioned in the outer extractor assembly. The outlet of the diffuser duct is connected to the outer extractor assembly. The water extractor further includes a gap between the inner duct and the outer duct. The gap is tapered between a first position and a second position.

The water extractor of the preceding paragraph can optionally include, additionally and/or alternatively, any one or more of the following features, configurations and/or additional components:

Wherein the gap between the inner duct and the outer duct is positioned at the inlet to the inner duct and between the inlet and the outlet of the outer duct.

Wherein the inner duct and the outer duct are curved ducts.

Wherein the first position is a radially innermost section of the curve, and wherein the second position is a radially outermost section of the curve.

Wherein a gap dimension G1 at the first position is greater than a gap dimension G2 at the second position.

Wherein a ratio of the gap dimension G2 to the gap dimension G1 is about 0.457.

Wherein the straight ejector duct has an outer diameter D1 at the inlet and an outer diameter D2 at the outlet; wherein the diffuser duct is positioned around the outlet of the straight ejector duct, and wherein the diffuser duct has an inner diameter D3 at the outlet and an outer diameter D4 at the outlet; and wherein the outer diameter D2 of the outlet of the straight ejector duct is about 17% to 21% smaller than the inner diameter D3 of the outlet of the diffuser duct.

Wherein a ratio of the outer diameter D2 to the inner diameter D3 is between 0.7795 and 0.8017; wherein a ratio of the outer diameter D1 to the outer diameter D2 is between 1.263 and 1.2935; and wherein a ratio of the inner diameter D3 to the outer diameter D4 is between 0.9072 and 0.9290.

Wherein the straight ejector duct has a length L1 from the inlet to the outlet, and wherein a ratio of length L1 to the outer diameter D2 is between 3.2378 and 3.3048.

The water extractor further includes a gap formed between the outlet of the diffuser duct and the outlet of the straight ejector duct, wherein the gap has a gap dimension G3 between an inner surface of the outlet of the diffuser duct and an outer surface of the outlet of the straight ejector duct; wherein a ratio of the gap dimension G3 to the outer diameter D2 and a ratio of the gap dimension G3 to the inner diameter D3 is between 0.1237 and 0.1415.

Wherein the diffuser duct further includes a collar positioned adjacent to the outlet of the diffuser duct; wherein the inner diameter D3 of the outlet of the diffuser duct is the inner diameter of the collar; wherein the outer diameter D4 of the outlet of the diffuser duct is the outer diameter of the collar; and wherein the collar of the diffuser duct is positioned against the second body portion of the outer extractor assembly to create a gutter between the diffuser duct and the outer extractor assembly.

Wherein the diffuser duct has a length L2 from the inlet to the outlet and the collar has a length L3, wherein a ratio of length L2 to inner diameter D3 is between 0.2686 and 0.2844, and wherein a ratio of length L3 to inner diameter D3 is between 0.0838 and 0.0973.

A water extractor includes a straight ejector duct of the water extractor including an inlet and an outlet and a diffuser duct of the water extractor including an inlet and an outlet. The straight ejector duct has an outer diameter D1 at the inlet and an outer diameter D2 at the outlet. The diffuser duct is positioned around the outlet of the straight ejector duct. The diffuser duct has an inner diameter D3 at the outlet and an outer diameter D4 at the outlet. The outer diameter D2 of the outlet of the straight ejector duct is about 17% to 21% smaller than the inner diameter D3 of the outlet of the diffuser duct.

The water extractor of the preceding paragraph can optionally include, additionally and/or alternatively, any one or more of the following features, configurations and/or additional components:

Wherein a ratio of the outer diameter D2 to the inner diameter D3 is between 0.7795 and 0.8017; wherein a ratio of the outer diameter D1 to the outer diameter D2 is between 1.263 and 1.2935; and wherein a ratio of the inner diameter D3 to the outer diameter D4 is between 0.9072 and 0.9290.

Wherein the straight ejector duct has a length L1 from the inlet to the outlet, and wherein a ratio of length L1 to the outer diameter D2 is between 3.2378 and 3.3048.

Wherein the straight ejector duct includes an inlet section adjacent to the inlet, a tapering section adjacent to the inlet section, a converging section adjacent to the tapering section, and an outlet section adjacent to the converging section and the outlet.

Wherein the converging section is angled at angle A1 with respect to the outlet section, and wherein angle A1 is about 13.87 degrees.

The water extractor further includes a gap formed between the outlet of the diffuser duct and the outlet of the straight ejector duct, wherein the gap has a gap dimension G3 between an inner surface of the outlet of the diffuser duct and an outer surface of the outlet of the straight ejector duct.

Wherein a ratio of the gap dimension G3 to the outer diameter D2 and a ratio of the gap dimension G3 to the inner diameter D3 is between 0.1237 and 0.1415.

Wherein the diffuser duct further includes a collar positioned adjacent to the outlet of the diffuser duct; wherein the inner diameter D3 of the outlet of the diffuser duct is the inner diameter of the collar; and wherein the outer diameter D4 of the outlet of the diffuser duct is the outer diameter of the collar.

Wherein the diffuser duct has a length L2 from the inlet to the outlet and the collar has a length L3, wherein a ratio of length L2 to inner diameter D3 is between 0.2686 and 0.2844, and wherein a ratio of length L3 to inner diameter D3 is between 0.0838 and 0.0973.

The water extractor further includes an outer extractor assembly including a first body portion, a second body portion connected to the first body portion, an inlet in the first body portion, an outlet in the second body portion, and diffuser vanes positioned in the first body portion and the second body portion; wherein the collar of the diffuser duct is positioned against the second body portion of the outer extractor assembly to create a gutter between the diffuser duct and the outer extractor assembly.

The water extractor further includes a swirler vane assembly including a body portion with an inlet and an outlet, and turning vanes positioned in the body portion adjacent to the inlet; an outer duct with an inlet and an outlet, wherein the inlet of the outer duct is connected to the outlet of the swirler vane assembly, and wherein the inlet of the outer extractor assembly is connected to the outlet of the outer duct; and an inner duct with an inlet and an outlet, wherein the outlet of the inner duct is connected to the inlet of the straight ejector duct.

A water extractor includes a swirler vane assembly including a body portion with an inlet and an outlet, and turning vanes positioned in the body portion adjacent to the inlet. The water extractor further includes an outer duct with an inlet and an outlet, and an inner duct with an inlet and an outlet. The inlet of the outer duct is connected to the outlet of the swirler vane assembly. The inner duct is positioned in the outer duct. The water extractor further includes an outer extractor assembly including a first body portion, a second body portion connected to the first body portion, an inlet in the first body portion, an outlet in the second body portion, and diffuser vanes positioned in the first body portion and the second body portion. The inlet to the outer extractor assembly is connected to the outlet of the outer duct. The water extractor further includes a straight ejector duct including an inlet and an outlet, and a diffuser duct including an inlet and an outlet. The straight ejector duct is positioned in the outer extractor assembly. The inlet of the straight ejector duct is connected to the outlet of the inner duct. The diffuser duct is positioned in the outer extractor assembly. The outlet of the diffuser duct is connected to the outer extractor assembly. The straight ejector duct has an outer diameter D1 at the inlet and an outer diameter D2 at the outlet. The diffuser duct is positioned around the outlet of the straight ejector duct, and wherein the diffuser duct has an inner diameter D3 at the outlet and an outer diameter D4 at the outlet. The outer diameter D2 of the outlet of the straight ejector duct is about 17% to 21% smaller than the inner diameter D3 of the outlet of the diffuser duct.

The water extractor of the preceding paragraph can optionally include, additionally and/or alternatively, any one or more of the following features, configurations and/or additional components:

Wherein a ratio of the outer diameter D2 to the inner diameter D3 is between 0.7795 and 0.8017; wherein a ratio of the outer diameter D1 to the outer diameter D2 is between 1.263 and 1.2935; and wherein a ratio of the inner diameter D3 to the outer diameter D4 is between 0.9072 and 0.9290.

Wherein the straight ejector duct has a length L1 from the inlet to the outlet, and wherein a ratio of length L1 to the outer diameter D2 is between 3.2378 and 3.3048.

Wherein the straight ejector duct includes an inlet section adjacent to the inlet, a tapering section adjacent to the inlet section, a converging section adjacent to the tapering section, and an outlet section adjacent to the converging section and the outlet, wherein the converging section is angled an angle A1 with respect to the outlet section, and wherein angle A1 is about 13.87 degrees.

The water extractor further includes a gap formed between the outlet of the diffuser duct and the outlet of the straight ejector duct, wherein the gap has a gap dimension G3 between an inner surface of the outlet of the diffuser duct and an outer surface of the outlet of the straight ejector duct; wherein a ratio of the gap dimension G3 to the outer diameter D2 and a ratio of the gap dimension G3 to the inner diameter D3 is between 0.1237 and 0.1415.

Wherein the diffuser duct further includes a collar positioned adjacent to the outlet of the diffuser duct; wherein the inner diameter D3 of the outlet of the diffuser duct is the inner diameter of the collar; wherein the outer diameter D4 of the outlet of the diffuser duct is the outer diameter of the collar; and wherein the collar of the diffuser duct is positioned against the second body portion of the outer extractor assembly to create a gutter between the diffuser duct and the outer extractor assembly.

Wherein the diffuser duct has a length L2 from the inlet to the outlet and the collar has a length L3, wherein a ratio of length L2 to inner diameter D3 is between 0.2686 and 0.2844, and wherein a ratio of length L3 to inner diameter D3 is between 0.0838 and 0.0973.

The water extractor further includes a gap between the inner duct and the outer duct, wherein the gap is tapered between a first position and a second position; wherein the inner duct and the outer duct are curved ducts; wherein the gap between the inner duct and the outer duct is positioned at the inlet to the inner duct and between the inlet and the outlet of the outer duct; wherein the first position is a radially innermost section of the curve, and wherein the second position is a radially outermost section of the curve; and wherein a gap dimension G1 at the first position is greater than a gap dimension G2 at the second position.

Wherein a ratio of the gap dimension G2 to the gap dimension G1 is about 0.457.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A water extractor comprising:
a straight ejector duct of the water extractor including an inlet and an outlet, wherein the straight ejector duct has an outer diameter D1 at the inlet and an outer diameter D2 at the outlet, and wherein the straight ejector duct includes an inlet section adjacent to the inlet, a tapering section adjacent to the inlet section, a converging section adjacent to the tapering section, and an outlet section adjacent to the converging section and the outlet; and
a diffuser duct of the water extractor including an inlet and an outlet, wherein the diffuser duct is positioned around the outlet of the straight ejector duct, and wherein the diffuser duct has an inner diameter D3 at the outlet and an outer diameter D4 at the outlet;
wherein the outer diameter D2 of the outlet of the straight ejector duct is about 17% to 21% smaller than the inner diameter D3 of the outlet of the diffuser duct.

2. The water extractor of claim 1, wherein:
a ratio of the outer diameter D2 to the inner diameter D3 is between 0.7795 and 0.8017;
a ratio of the outer diameter D1 to the outer diameter D2 is between 1.263 and 1.2935; and
a ratio of the inner diameter D3 to the outer diameter D4 is between 0.9072 and 0.9290.

3. The water extractor of claim 1, wherein the straight ejector duct has a length L1 from the inlet to the outlet, and wherein a ratio of length L1 to the outer diameter D2 is between 3.2378 and 3.3048.

4. The water extractor of claim 1, wherein the converging section is angled at angle A1 with respect to the outlet section, and wherein angle A1 is about 13.87 degrees.

5. The water extractor of claim 1, and further comprising:
a gap formed between the outlet of the diffuser duct and the outlet of the straight ejector duct, wherein the gap has a gap dimension G3 between an inner surface of the outlet of the diffuser duct and an outer surface of the outlet of the straight ejector duct.

6. The water extractor of claim 5, wherein a ratio of the gap dimension G3 to the outer diameter D2 and a ratio of the gap dimension G3 to the inner diameter D3 is between 0.1237 and 0.1415.

7. The water extract of claim 1, wherein the diffuser duct further includes:
a collar positioned adjacent to the outlet of the diffuser duct;
wherein the inner diameter D3 of the outlet of the diffuser duct is the inner diameter of the collar; and
wherein the outer diameter D4 of the outlet of the diffuser duct is the outer diameter of the collar.

8. The water extractor of claim 7, wherein the diffuser duct has a length L2 from the inlet to the outlet and the collar has a length L3, wherein a ratio of length L2 to inner diameter D3 is between 0.2686 and 0.2844, and wherein a ratio of length L3 to inner diameter D3 is between 0.0838 and 0.0973.

9. The water extractor of claim 7, and further comprising:
an outer extractor assembly including a first body portion, a second body portion connected to the first body portion, an inlet in the first body portion, an outlet in the second body portion, and diffuser vanes positioned in the first body portion and the second body portion;
wherein the collar of the diffuser duct is positioned against the second body portion of the outer extractor assembly to create a gutter between the diffuser duct and the outer extractor assembly.

10. The water extractor of claim 9, and further comprising:
a swirler vane assembly including a body portion with an inlet and an outlet, and turning vanes positioned in the body portion adjacent to the inlet;
an outer duct with an inlet and an outlet, wherein the inlet of the outer duct is connected to the outlet of the swirler vane assembly, and wherein the inlet of the outer extractor assembly is connected to the outlet of the outer duct; and
an inner duct with an inlet and an outlet, wherein the outlet of the inner duct is connected to the inlet of the straight ejector duct.

11. A water extractor comprising:
a swirler vane assembly including a body portion with an inlet and an outlet, and turning vanes positioned in the body portion adjacent to the inlet;
an outer duct with an inlet and an outlet, wherein the inlet of the outer duct is connected to the outlet of the swirler vane assembly;
an inner duct with an inlet and an outlet, wherein the inner duct is positioned in the outer duct;
an outer extractor assembly including a first body portion, a second body portion connected to the first body portion, an inlet in the first body portion, an outlet in the second body portion, and diffuser vanes positioned in the first body portion and the second body portion, wherein the inlet to the outer extractor assembly is connected to the outlet of the outer duct;
a straight ejector duct including an inlet and an outlet, wherein the straight ejector duct is positioned in the outer extractor assembly, and wherein the inlet of the straight ejector duct is connected to the outlet of the inner duct;
a diffuser duct including an inlet and an outlet, wherein the diffuser duct is positioned in the outer extractor assembly, and wherein the outlet of the diffuser duct is connected to the outer extractor assembly; and
wherein the straight ejector duct has an outer diameter D1 at the inlet and an outer diameter D2 at the outlet;
wherein the diffuser duct is positioned around the outlet of the straight ejector duct, and wherein the diffuser duct has an inner diameter D3 at the outlet and an outer diameter D4 at the outlet; and
wherein the outer diameter D2 of the outlet of the straight ejector duct is about 17% to 21% smaller than the inner diameter D3 of the outlet of the diffuser duct.

12. The water extractor of claim 11, wherein:
a ratio of the outer diameter D2 to the inner diameter D3 is between 0.7795 and 0.8017;
a ratio of the outer diameter D1 to the outer diameter D2 is between 1.263 and 1.2935; and a ratio of the inner diameter D3 to the outer diameter D4 is between 0.9072 and 0.9290.

13. The water extractor of claim 11, wherein the straight ejector duct has a length L1 from the inlet to the outlet, and wherein a ratio of length L1 to the outer diameter D2 is between 3.2378 and 3.3048.

14. The water extractor of claim 11, wherein the straight ejector duct includes an inlet section adjacent to the inlet, a tapering section adjacent to the inlet section, a converging section adjacent to the tapering section, and an outlet section adjacent to the converging section and the outlet, wherein the converging section is angled an angle A1 with respect to the outlet section, and wherein angle A1 is about 13.87 degrees.

15. The water extractor of claim 11, and further comprising:
 a gap formed between the outlet of the diffuser duct and the outlet of the straight ejector duct, wherein the gap has a gap dimension G3 between an inner surface of the outlet of the diffuser duct and an outer surface of the outlet of the straight ejector duct;
 wherein a ratio of the gap dimension G3 to the outer diameter D2 and a ratio of the gap dimension G3 to the inner diameter D3 is between 0.1237 and 0.1415.

16. The water extract of claim 11, wherein the diffuser duct further includes:
 a collar positioned adjacent to the outlet of the diffuser duct;
 wherein the inner diameter D3 of the outlet of the diffuser duct is the inner diameter of the collar;
 wherein the outer diameter D4 of the outlet of the diffuser duct is the outer diameter of the collar; and
 wherein the collar of the diffuser duct is positioned against the second body portion of the outer extractor assembly to create a gutter between the diffuser duct and the outer extractor assembly.

17. The water extractor of claim 16, wherein the diffuser duct has a length L2 from the inlet to the outlet and the collar has a length L3, wherein a ratio of length L2 to inner diameter D3 is between 0.2686 and 0.2844, and wherein a ratio of length L3 to inner diameter D3 is between 0.0838 and 0.0973.

18. The water extractor of claim 11, and further comprising:
 a gap between the inner duct and the outer duct, wherein the gap is tapered between a first position and a second position;
 wherein the inner duct and the outer duct are curved ducts;
 wherein the gap between the inner duct and the outer duct is positioned at the inlet to the inner duct and between the inlet and the outlet of the outer duct;
 wherein the first position is a radially innermost section of the curve, and wherein the second position is a radially outermost section of the curve; and
 wherein a gap dimension G1 at the first position is greater than a gap dimension G2 at the second position.

19. The water extractor of claim 18, wherein a ratio of the gap dimension G2 to the gap dimension G1 is about 0.457.

* * * * *